Dec. 13, 1932. J. J. TOKHEIM 1,890,870
CONTROL VALVE FOR VOLATILE LIQUID STORAGE TANKS
Filed April 9, 1929 2 Sheets-Sheet 1

WITNESSES:—
Chas. L. Griesbauer
Cundy D. Groff

Inventor
John J. Tokheim,
By D. P. Wolehander
Attorney

Dec. 13, 1932.  J. J. TOKHEIM  1,890,870
CONTROL VALVE FOR VOLATILE LIQUID STORAGE TANKS
Filed April 9, 1929  2 Sheets-Sheet 2
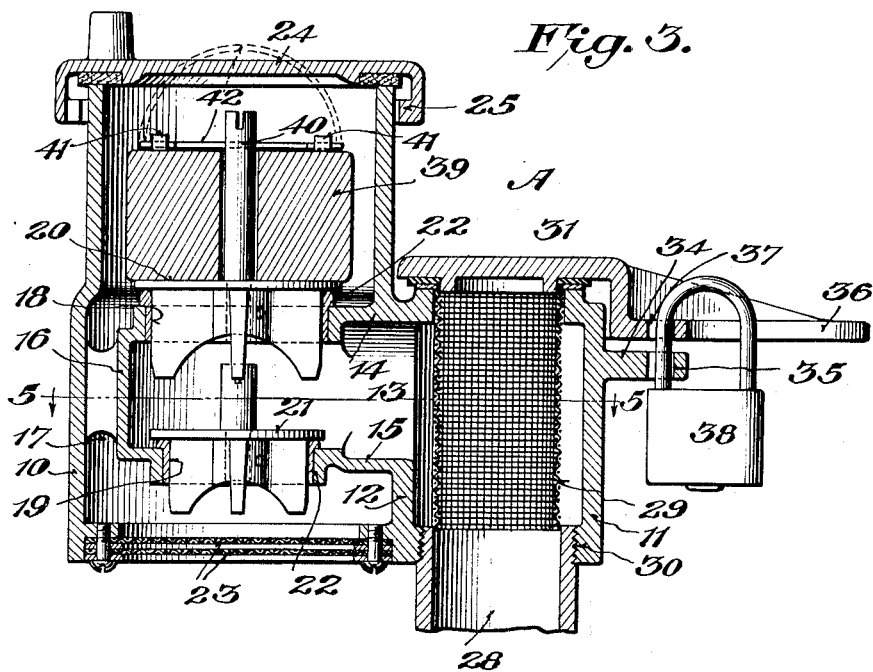
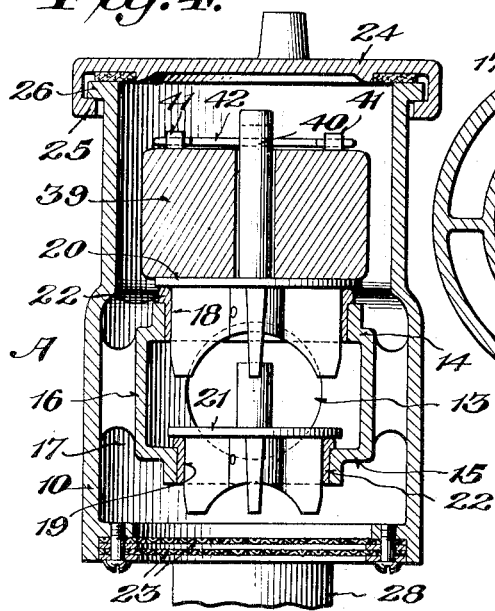
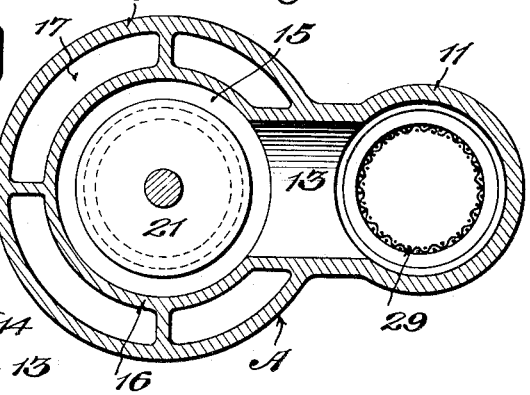
Inventor
John J. Tokheim,
By
Attorney
WITNESSES:

Patented Dec. 13, 1932

1,890,870

UNITED STATES PATENT OFFICE

JOHN J. TOKHEIM, OF CEDAR RAPIDS, IOWA

CONTROL VALVE FOR VOLATILE LIQUID STORAGE TANKS

Application filed April 9, 1929. Serial No. 353,833.

This invention relates to improvements in valves for use on volatile liquid storage tanks and has for one of its more important objects to provide a valve which will eliminate substantially all waste and deterioration of the liquid due to evaporation, and which will relieve partial vacuums formed in the tank due to condensation, drawing off of liquid from the tank or to other causes.

Other objects of the invention are to provide a valve for the purpose mentioned which is composed of a minimum number of parts relatively cheap and easy to produce and easy to assemble and disassemble, and to provide a valve so constructed that without disturbing any of the operating parts thereof access may readily be had therethrough to a tank for insertion therein of a measuring tape, thermometer, gravity tester or the like.

With the foregoing and other purposes in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Fig. 3 is a central longitudinal section through the valve on the line 3—3 of Fig. 2.

Fig. 4 is a transverse section on the line 4—4 of Fig. 2; and

Fig. 5 is a horizontal section on the line 5—5 of Fig. 3.

Figure 1:
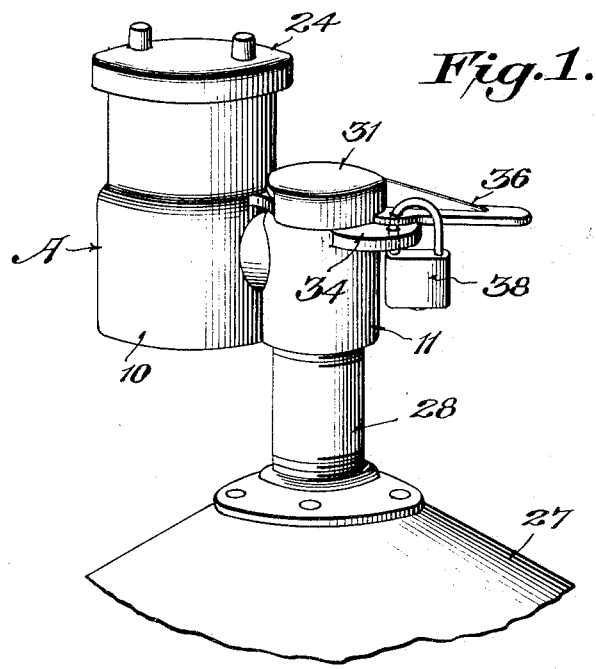
Figure 1 is a perspective view illustrating the present valve operatively mounted on a tank.
Figure 2:
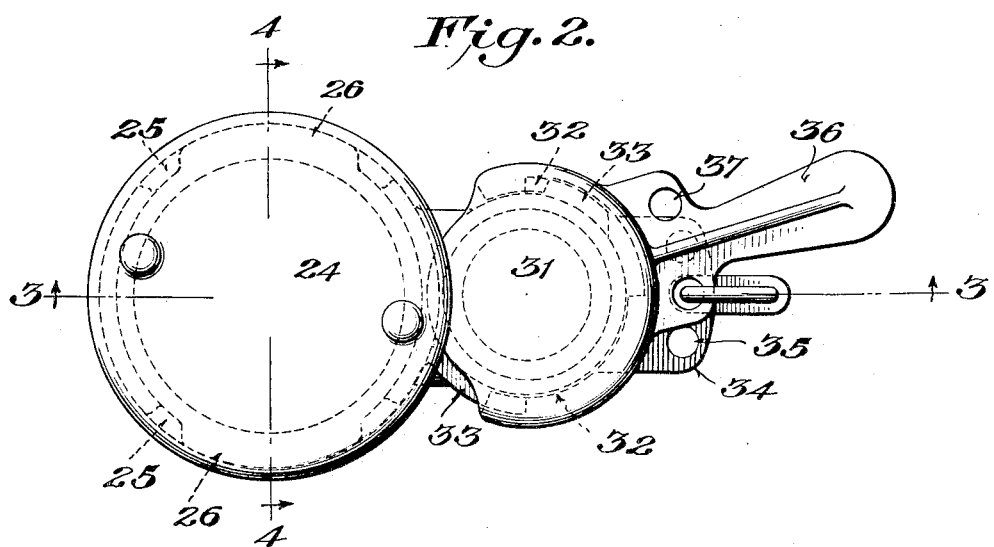
Fig. 2 is a top plan view of the valve.

As is well known, when volatile liquids such as crude petroleum and its derivatives are stored in closed tanks means must be provided to vent the tanks in order to relieve pressures produced therein by evaporation of the liquid and to relieve partial vacuums produced therein by condensation of vapors of evaporation or by reason of other causes. If a volatile liquid storage tank is vented directly to the atmosphere the loss of liquid due to evaporation may be considerable over a relatively short period of time, and moreover, since the more volatile part of the liquid escapes first it follows that in instances where a tank is vented directly to the atmosphere, the quality of the liquid deteriorates rapidly with losses of liquid due to evaporation. It is therefore the purpose of the present invention to provide a valve which will provide for relief of excessive pressures and partial vacuums within a liquid storage tank and which will, as aforesaid, enable elimination of substantially all waste and deterioration of the liquid due to evaporation. To this end the present valve consists of a casing A inclusive of a pair of cylinders or chambers 10 and 11 preferably integrally cast from suitable metal and disposed vertically in side to side relation with their interiors separated from one another by a common wall 12 through which is formed an opening 13.

Cast or otherwise provided within cylinder or chamber 10 is a pair of horizontally disposed partition members 14 and 15 connected together by a wall 16 space from the inner face of said cylinder 10 to provide a passageway 17 affording constant communication between the upper and lower end portions of said cylinder, said members 14 and 15 being located, respectively, above and below opening 13 whereby cylinder 11 is in constant communication through said opening with the space between said members.

Formed in the partition members 14 and 15 are ports 18 and 19, respectively, controlled, respectively, by valves 20 and 21 of the poppet type which open upwardly and close downwardly, said ports preferably being provided with bushings 22 of suitable material affording seats for said valves and the upper port 18 preferably being slightly larger than the lower port 19 whereby valve 21 which controls the lower port 19 may, in the assembly and disassembly of the device, be passed through said upper port.

Removably secured across the lower open end of cylinder 10 is one or more fire flash screens 23, while normally closing the upper end of said cylinder is a cover 24 which may be detachably connected with said cylinder by cooperating flanges 25, 26 projecting inwardly from the cover and outwardly from the cylinder, respectively, these flanges being suitably spaced whereby slight rotation of the cover is sufficient to engage its flanges beneath the flanges of the cylinder to retain the cover on the cylinder.

The lower end of cylinder 11 is adapted for connection with a top portion of a volatile liquid storage tank, herein indicated at 27, and to this end said cylinder may be threaded as shown for attachment to a pipe nipple 28 which may be connected in any preferred manner with the tank.

Within cylinder 11 is mounted a tubular screen 29 open at its ends, disposed coaxially with said cylinder and with nipple 28, and contacting at its lower end with the upper end of said nipple or with the threaded flange 30 in which the upper end of said nipple is engaged, whereby foreign matter is prevented from passing from the tank into opening 13 or from said opening into the tank, and whereby a tape line, thermometer or other device may be passed downwardly from the top of cylinder 11, when same is uncovered, into the tank to determine the condition of liquid stored therein.

Normally, the upper end of cylinder 11 is closed by a cover 31 retained on said cylinder by means of cooperating flanges 32, 33 on the cover and cylinder, respectively, similar to the flanges 25, 26 so that by slight rotation of said cover it is free to be lifted free of the cylinder, while to secure said cover against removal by unauthorized persons a flange 34 provided with one or more apertures 35 is formed on cylinder 11 and a handle extension 36 of said cover is provided with one or more apertures 37 any one of which is adapted for alinement with any one of the flange openings to receive the hasp of a pad-lock 38.

The operation of the device is apparent and as follows: Depending upon the nature of the liquid stored in tank 27, a member 39 of sufficient we:ght or, equivalently, of sufficient tension to hold the valve 20 closed under the pressure at which the liquid vapors will condense, is so associated with said valve as to perform this function so that as evaporation of the liquid occurs the vapors are reta:ned under compression and thereby caused to condense and return in liquid form to the tank. If, however, the pressure produced as a result of evaporation should rise so high as to endanger the tank the holding force of member 39 will be overcome and valve 20 will be lifted from its seat, allowing escape of vapor through the passageway 17 and from the lower end of cylinder 10 until the lowering pressure enables member 39 to again close said valve. On the other hand if, because of condensation of vapor within tank 27 or because of other reasons, a vacuum should tend to form within tank 27, valve 21 may open to admit air to the tank and thus relieve such tendency. It will be apparent therefore that the present device affords a safety appliance insuring against the formation of excessive pressures within tank 27 and at the same time serves to eliminate substantially all waste of liquid from the tank due to evaporation under normal conditions. Moreover, as previously stated, by removing cover 31 a tape line, thermometer or other device may readily be lowered into tank 27 without disturbing valves 20, 21.

The seat of valve 21 preferably is located above the bottom of opening 13 whereby condensed vapors will drain from said valve and thus to eliminate any possibility of said valve becoming frozen to its seat during cold weather, while member 39 which may conveniently consist of a weight, preferably has a hole formed therethrough to receive a stem 40 projecting upwardly from valve 20 whereby said weight and valve may be retained in operative assembly with one another. Moreover, said weight preferably is provided with spaced, apertured lugs 41 for the reception of the ends of a bail 42 which is provided to facilitate engagement and disengagement of said weight with and from the stem of said valve 20.

From the foregoing description considered in connection with the accompanying drawings it is believed that the construction, operation and advantages of the present device will be clearly understood. It is desired to point out, however, that various changes and desirable additions may be made in and to the structure shown within the spirit and scope of the invention as defined in the appended claims.

I claim:—

1. A valve device of the character described comprising a hollow member, a pair of spaced transverse partition members within said hollow member having ports therein respectively, valves controlling said ports, a second hollow member disposed to one side of said first hollow member and connected with the space between said partition member, said second hollow member being adapted for connection at one end with a liquid storage tank, and a removable cover normally closing the other end thereof.

2. A valve device of the character described comprising a pair of hollow members arranged in side to side relation, a pair of spaced transverse partition members within one of said hollow members, means providing a passageway connecting the interior of the other hollow member with the space between said partition members, said partition members having ports therein, valves controlling said ports, means for connecting said second mentioned hollow member with a liquid storage tank, and a screen disposed across said passageway.

3. A valve device of the character described comprising a pair of hollow members disposed in side to side relation, a wall separating said members having an opening therein, a pair of transverse partition members within one of said hollow members disposed, respectively upon opposite sides of said opening, a wall in spaced relation to the inner face of the hollow member containing said partition members connecting the latter together, said partition members having ports therein, valves controlling said ports, a removable cover for one end of the other of said hollow members, means for connecting the other end of this latter hollow member with a liquid storage tank, and a tubular screen within said last mentioned hollow member extending from end to end thereof and across the aforementioned opening.

4. A valve device of the character described comprising a vertically disposed hollow cylinder open at its lower end, a removable cover normally closing the upper end thereof, fire flash screens disposed across the lower end thereof, a pair of vertically spaced horizontal partition walls within said cylinder, a wall in spaced relation to the inner face of said cylinder connecting said partition members with one another, said partition members having ports therein, upwardly opening valves of the poppet type controlling said ports, a second vertically disposed hollow cylinder located beside said first cylinder, a wall between said cylinders having an opening therethrough providing communication between the interior of said second cylinder and the space between said partition members, a removable cover normally closing the upper end of said second mentioned cylinder, and means for connecting the lower end of said second mentioned cylinder with a liquid storage tank.

5. In combination with a storage tank for liquids of varying volatility, a valve controlled vapor outlet for said tank, and means whereby valve seating means of different weights may be employed in conjunction with said valve to maintain the latter in closing relation to said outlet under the tank pressure at which any particular liquid stored therein will vaporize, said valve being arranged to overcome the force of said seating means and to be opened by tank pressure when the latter reaches a predetermined value above the pressure at which vapors from the particular liquid stored in the tank will condense.

6. A device of the character described comprising a casing adapted for connection with a liquid storage tank, a valve within said casing for controlling the escape of vapors from said tank, a weight detachably engageable with said valve for holding said valve seated, and a bail carried by said weight to facilitate its engagement with and disengagement from said valve.

7. A vapor control valve for volatile liquid storage tanks comprising in combination with the tank having a vent pipe, of a tubular member adapted to be fitted to the end of said vent pipe, cover means for the end of said member opposite that connected with said vent pipe, and a tubular valve casing member offset to one side of said member fitted to the vent pipe and having spaced valve seats therein, said tubular valve casing member being connected to said member fitted to the vent pipe and having a port for establishing communication between the member attached to the vent pipe and the space between said valves.

8. In a valve device for volatile liquid storage tanks, a casing having a pressure relief port, said casing also having a threaded opening adapted to be fitted to a vent pipe of the tank and a wall portion of the casing opposite the threaded opening being formed with an access opening, a removable cover for said access opening whereby when the cover is removed a gage member may be inserted through the access opening and into the tank through said threaded opening, a valve normally covering the relief port, and means for regulating the seating pressure of said valve.

9. In a valve device for volatile liquid storage tanks, a casing having a relief port, a valve adapted to normally seat on said relief port and having a stem, and a weight having an opening for fitting over said stem thereby to impose a predetermined seating pressure on said valve.

10. In a valve device for volatile liquid storage tanks, a casing having a relief port, a gravity valve normally covering said relief port, a stem on said relief valve, a weight having an opening detachably engaging with said valve at the side opposite its seat, and a removable cover member carried by the casing and overlying the said weight on the relief valve.

11. A combined valve device and gauge hole unit for volatile liquid storage tanks comprising a one-piece casting including a hollow member, a pair of spaced transverse partitions within said hollow member having ports therein, valves controlling said ports, a second hollow member disposed to one side of said first hollow member and communicating with the space between said partitions, said second hollow member being adapted for connection at one end with a liquid storage tank, and a removable cover normally closing the other end thereof.

In testimony whereof I hereunto affix my signature.

JOHN J. TOKHEIM.